Oct. 26, 1965     D. L. GROVE     3,214,049
SELF-UNLOADING FORAGE VEHICLE
Filed July 12, 1962                5 Sheets-Sheet 1

FIG. I

INVENTOR.
DWIGHT L. GROVE
BY
ATTORNEY

Oct. 26, 1965    D. L. GROVE    3,214,049
SELF-UNLOADING FORAGE VEHICLE
Filed July 12, 1962    5 Sheets-Sheet 2

INVENTOR.
DWIGHT L. GROVE
BY
Rupert J Brady
ATTORNEY

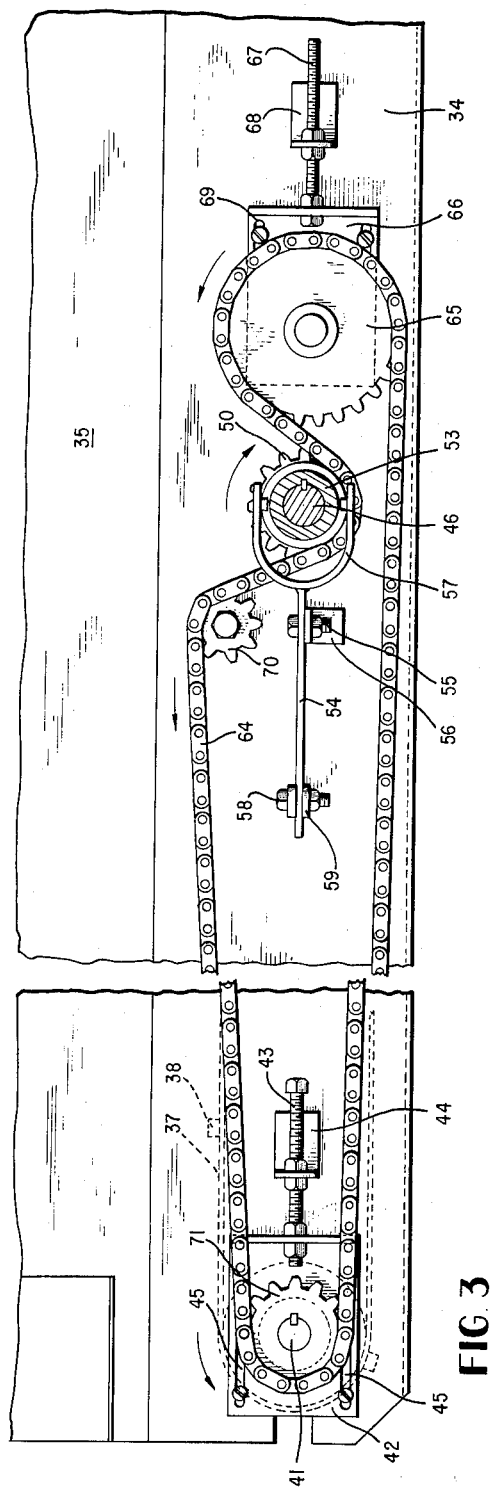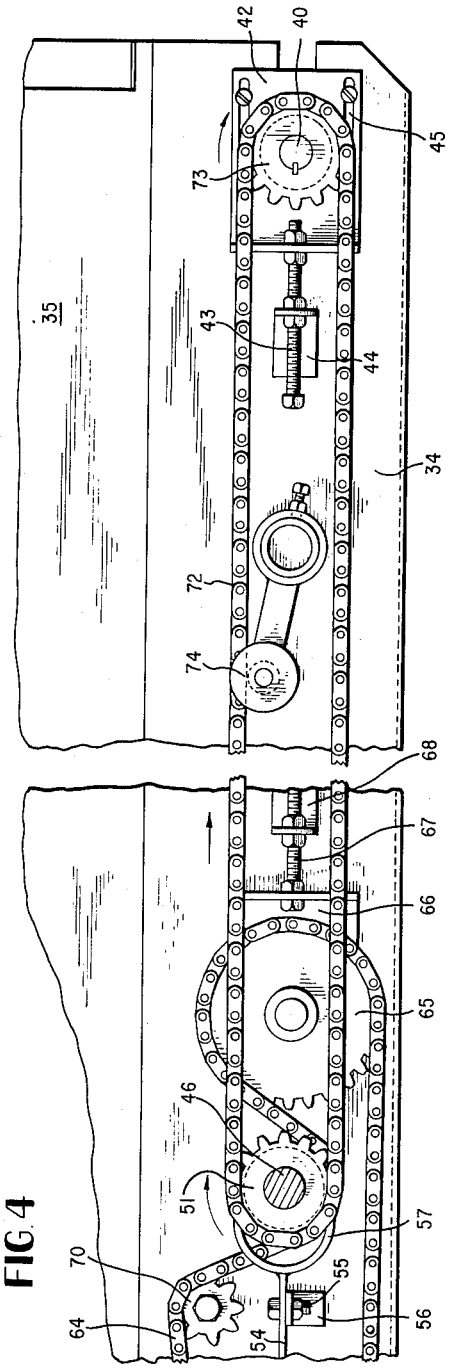

Oct. 26, 1965　　　　　　　D. L. GROVE　　　　　3,214,049
SELF-UNLOADING FORAGE VEHICLE
Filed July 12, 1962　　　　　　　　　　　　　5 Sheets-Sheet 4

INVENTOR.
DWIGHT L. GROVE
BY
Rupert J. Brady
ATTORNEY

Oct. 26, 1965   D. L. GROVE   3,214,049
SELF-UNLOADING FORAGE VEHICLE
Filed July 12, 1962   5 Sheets-Sheet 5
FIG. 7
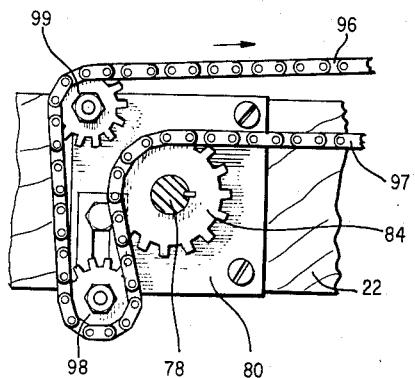
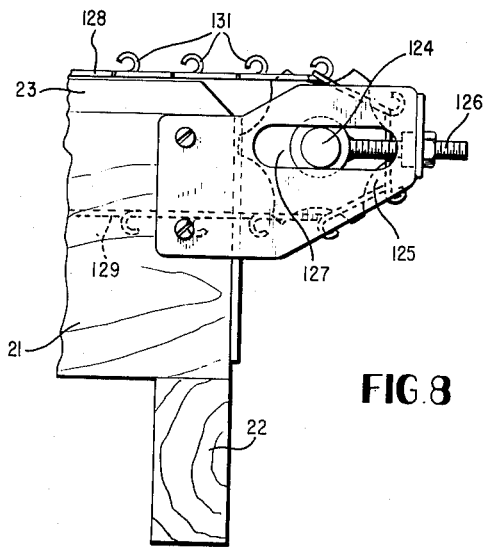
FIG. 8
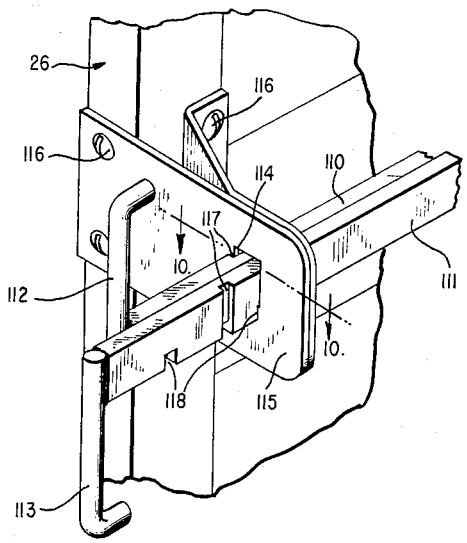
FIG. 9
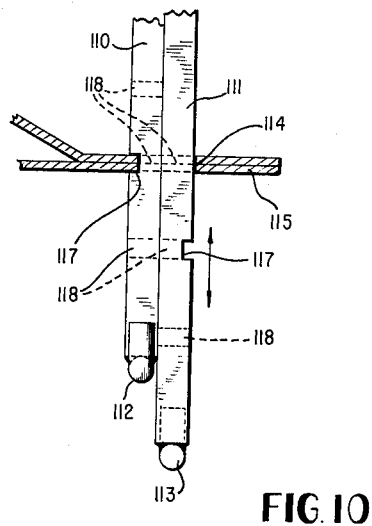
FIG. 10
INVENTOR.
DWIGHT L. GROVE
BY
Rupert J. Brady
ATTORNEY

United States Patent Office 3,214,049
Patented Oct. 26, 1965

3,214,049
SELF-UNLOADING FORAGE VEHICLE
Dwight L. Grove, Shady Grove, Pa., assignor to Grove Manufacturing Company, Shady Grove, Pa., a corporation of Pennsylvania
Filed July 12, 1962, Ser. No. 209,358
9 Claims. (Cl. 214—519)

This invention relates to a self-unloading vehicle and vehicle body, and more particularly to a vehicle for discharging various kinds of forage and the like.

The object of the invention is to provide a forage body or truck which is capable of selectively discharging forage from the right-hand or left-hand side thereof and also from its rear end in controlled and varying amounts, due to a novel and simplified variable speed drive and reversing means for the main apron or conveyer of the machine.

Another object is to provide a forage and like material discharging vehicle having a lateral front discharging conveyer which may be operated in either of two directions by the mere shifting of a clutch device and without the necessity of moving or otherwise altering the discharge conveyer structure.

Still another object is to provide a self-unloading vehicle which is highly flexible in operation and thereby capable of a variety of uses; the discharge conveyer mechanism being manually controlled by a simple system of operating levers readily accessible from the exterior of the vehicle.

Another object is to provide a self-unloading vehicle of the mentioned character having agitator or beater means which may be rendered active or idle at the will of the operator as the need requires.

Another object is to provide a machine of the mentioned character which is rugged and durable, highly simplified, economical to manufacture and easy to maintain.

Still another object is to provide a machine of the mentioned character whose various moving components are all powered by a single continuously driven rotary shaft adapted to be coupled to the power take off shaft of a farm tractor or the like.

Other objects and advantages of the invention will be apparent during the course of the following description.

Figure 1:
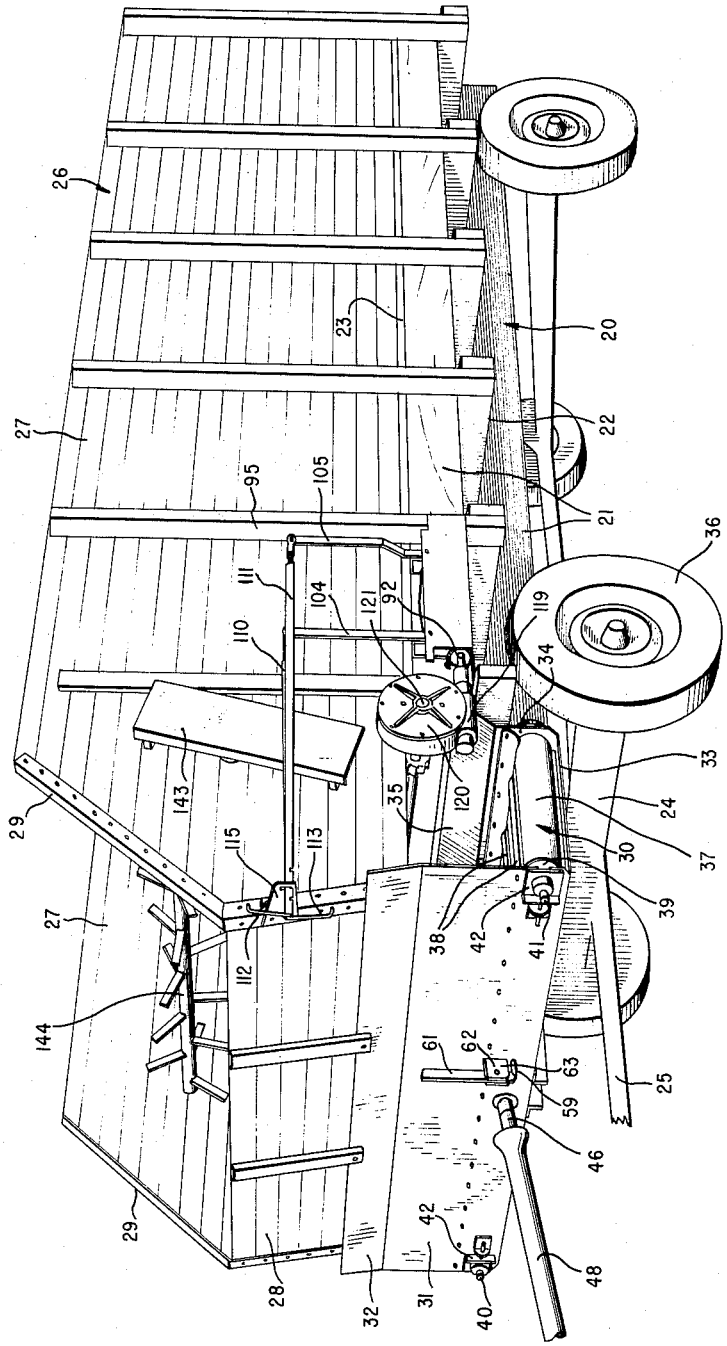
Figure 2:
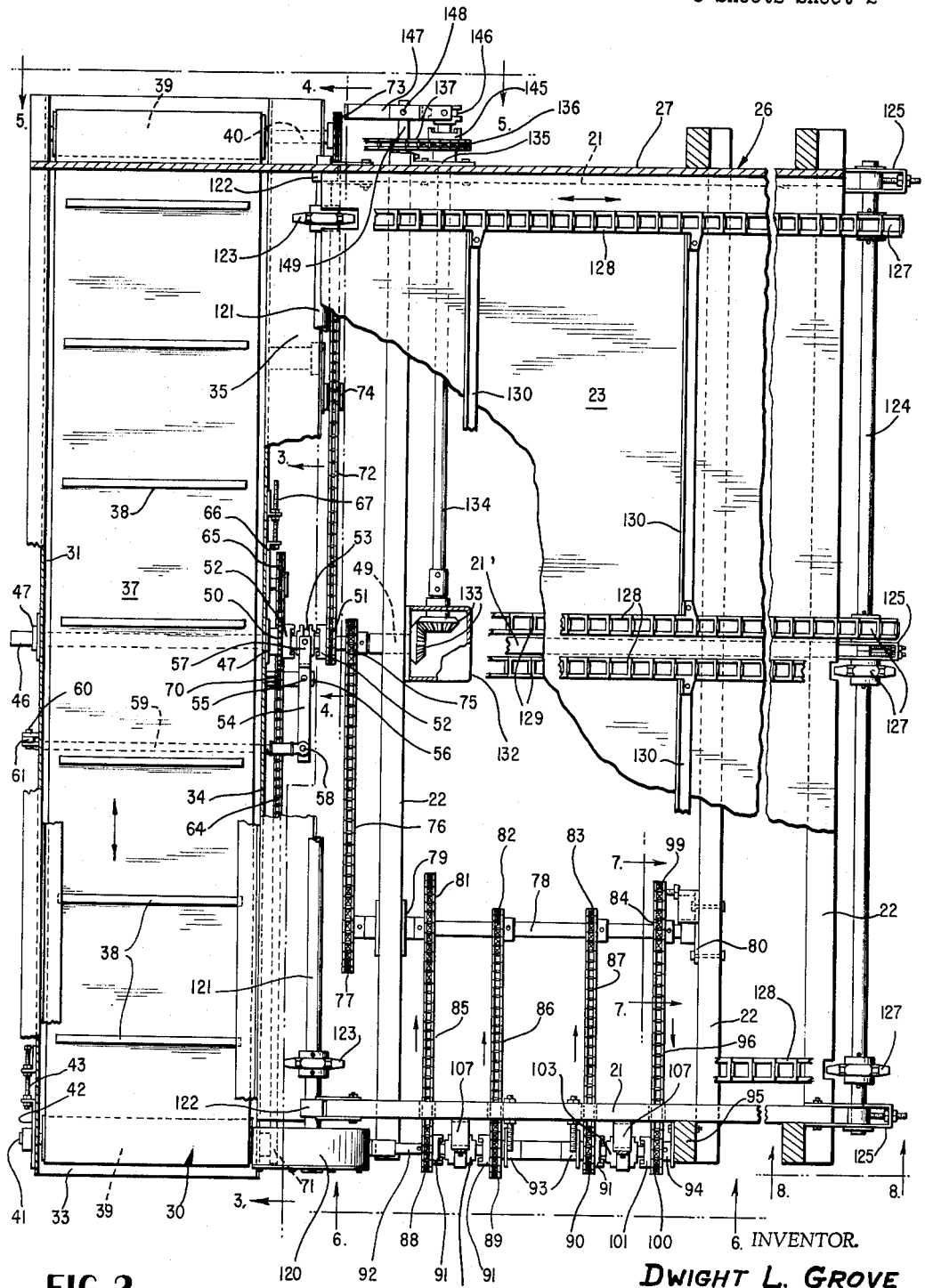
Figures 5, 6:
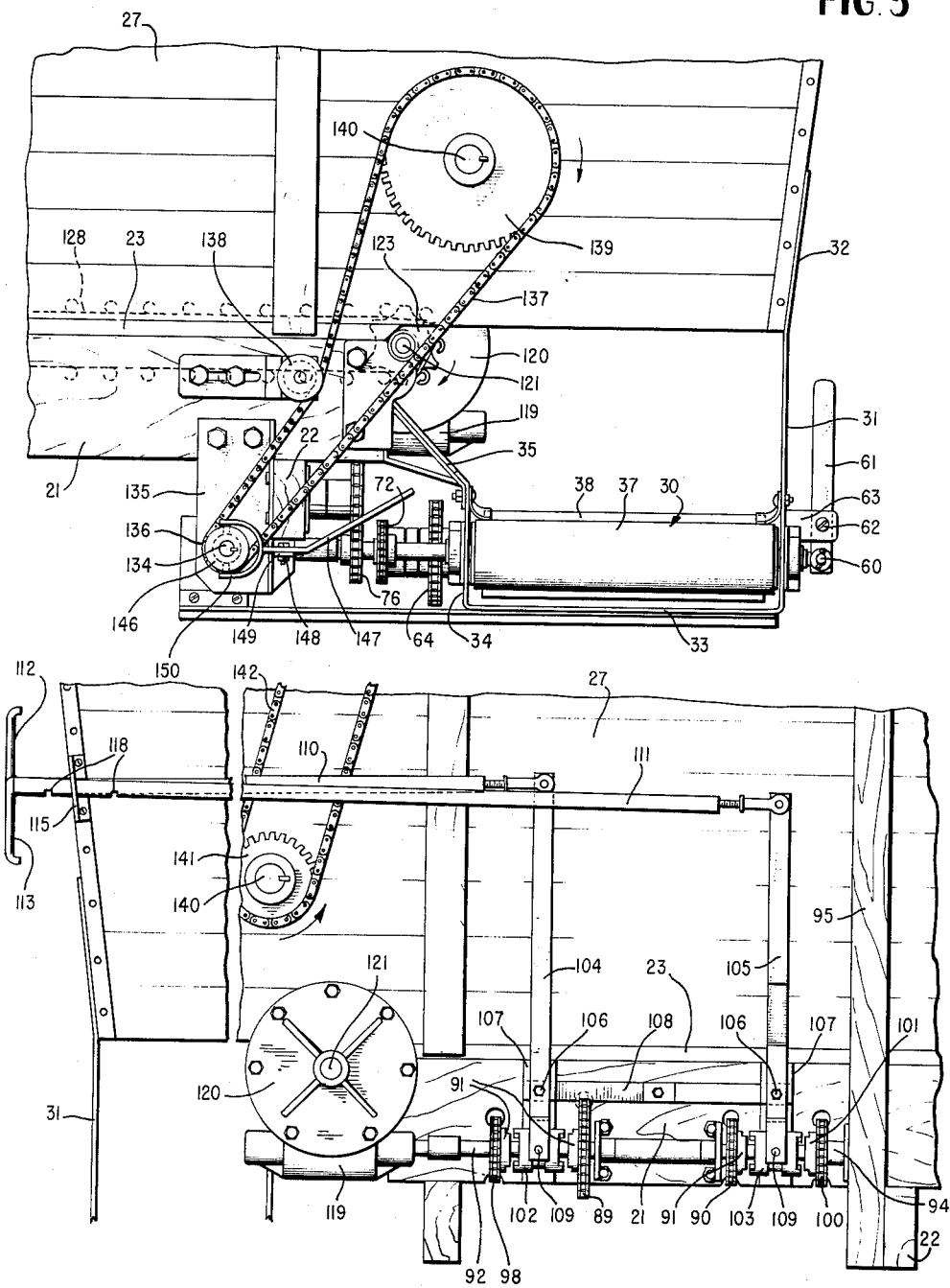

In the accompanying drawings forming a part of this application and in which like numerals are employed to designate like parts throughout the same, FIGURE 1 is a perspective view of a forage and like material discharging vehicle according to the invention, parts omitted, FIGURE 2 is an enlarged fragmentary plan view of the vehicle partly in section and with parts omitted for the purpose of clarity and simplification, FIGURE 3 is a fragmentary transverse vertical section taken on line 3—3 of FIGURE 2, FIGURE 4 is a similar section taken on line 4—4 of FIGURE 2, FIGURE 5 is an enlarged fragmentary side elevation taken substantially on line 5—5 of FIGURE 2, FIGURE 6 is a similar fragmentary side elevation taken substantially on line 6—6 of FIGURE 2, FIGURE 7 is an enlarged fragmentary vertical section taken on line 7—7 of FIGURE 2, FIGURE 8 is a fragmentary side elevation taken on line 8—8 of FIGURE 2, FIGURE 9 is an enlarged fragmentary perspective view of clutch control means for the variable speed reversible main apron drive, and FIGURE 10 is a fragmentary horizontal section taken on line 10—10 of FIGURE 9.

In the drawings, wherein for the purpose of illustration is shown a preferred embodiment of the invention, attention is directed first to FIGURE 1 showing the self-unloading vehicle of the invention as a whole. In FIGURE 1, the numeral 20 designates generally a substantially conventional wagon chassis having main longitudinal beams 21 and spaced cross beams 22 resting upon the beams 21 and suitably secured thereto and providing a support for the horizontal floor or bed 23 of the wagon. The chassis 20 includes a front steering axle 24 having a drawing tongue 25 for connection with a towing farm tractor or the like, not shown.

The wagon further comprises a large box-like body 26 entirely open at its top and having vertical side walls 27 and a foreshortened forward end wall 28, as shown. The rear end of the wagon body 26 may be equipped with any preferred type of gate or partial vertical wall providing a suitable discharge opening adjacent the bed 23, and not shown in the drawings. The wagon bed 23 terminates somewhat rearwardly of the forward end wall 28 to provide a vertically open passage between the wall 28 and bed 23 and below the latter. The wall 28 need not extend below the elevation of the bed 23. The forward corners of the wagon body side walls may be cut back on angles as shown at 29. The construction of the forward end of the wagon body provides visibility for the tractor operator in advance of the wagon, enabling him to view the contents of the wagon at any time.

The self-unloading vehicle further comprises a front horizontal transverse discharge conveyer 30, preferably detachably mounted bodily upon the body 26 so as to be replaceable when necessary. The conveyer 30 includes a preferably sheet metal open-ended transverse trough-like support including a substantially vertical front wall 31 having an upper flange 32 suitably rigidly and detachably secured to the wall 28 near the bottom of the latter. The sheet metal support further comprises an integral horizontal bottom wall 33, and a relatively short vertical rear wall 34 having an upper inclined flange 35, suitably rigidly secured to the wagon chassis and forming an entrance slide leading from the horizontal bed 23 to the transverse conveyer 30. The entire conveyer 30 is disposed forwardly of the front wheels 36 of the vehicle for discharging material upon opposite sides of the vehicle outwardly of the wheels thereof. The conveyer 30 in the preferred form of the invention includes an endless flexible belt 37 provided on its outer side at spaced intervals with flights or slats 38 to aid in conveying various types of animal food and other produce toward opposite sides of the vehicle. The belt 37 engages over end rollers 39, keyed respectively to rotary shafts 40 and 41, journaled for rotation on self-aligning adjustable bearing brackets 42, mounted upon the outer faces of the sheet metal walls 31 and 34 as shown in the drawings. The bearing brackets 42 are rendered adjustable transversely of the vehicle and longitudinally of the belt 37 by means of adjusting screws 43 cooperating with fixed brackets 44 on the conveyer support. The bearing brackets 42 are horizontally slotted at 45 to permit their adjustment under influence of the screws 43. By this means, the belt 37 and chain gearing to be described may be rendered suitably taut.

A constantly rotating input drive shaft 46 extends longitudinally of the vehicle at the transverse center thereof and is journaled for rotation in suitable bearings 47, secured to the vertical walls 31 and 34 of the transverse conveyer support. The drive shaft 46 is disposed above the bottom wall 33 and extends between the top and bottom runs of the conveyer belt 37, transversely thereof, FIGURE 2. The forward end of the shaft 46 is adapted to be coupled with a suitable shaft extension 48, driven by the power take-off shaft of the towing tractor not shown. The shaft 46 as shown clearly in FIGURE 2 extends rearwardly of the conveyer 30 and has its rear end journaled within a suitable bearing 49 secured to the forwardmost cross beam of the wagon chassis.

First and second sprocket gears 50 and 51 are freely rotatably mounted upon the drive shaft 46 in axially spaced relation, just rearwardly of the conveyor 30 and are suitably held against axial movement by conventional roll pins or the like. These sprocket gears are provided with spaced opposed toothed clutch heads 52, integral therewith. Intermediate the spaced clutch heads 52, a double-faced cooperating toothed clutch element 53 is keyed slidably to the shaft 46 to turn therewith and shiftable axially in opposite directions toward engagement with either of the clutch heads 52 so that rotation may be imparted selectively to either sprocket gear 50 or 51. The clutch element 53 is shifted axially by means of a transverse lever 54 pivoted intermediate its ends as at 55 to a fixed bracket 56 rigid with the vertical wall 34. The lever 54 has a yoke end 57 connected with the clutch element 53 to shift the same. The remote end of the lever 54 is pivoted at 58 to a longitudinal shifter link 59 extending through and across the conveyer structure above the bottom wall 33 and pivotally connected at its forward end as at 60 to a vertically swingable hand lever 61, in turn pivoted above its lower end at 62 to a fixed bracket 63 on the outer face of vertical wall 31. The forward end of the link 59 is pivoted to the lower end of the hand lever 61 so that swinging of the latter will shift the link 59 longitudinally and turn the lever 54 upon its pivot 55 to effect the shifting of the clutch element 53 in one direction or the other. The lever 61 is readily accessible at the front of the vehicle as shown in FIGURE 1.

A first transversely extending generally horizontal sprocket chain 64 engages beneath the sprocket gear 50, FIGURES 2 and 3, and about an idler sprocket gear 65 journaled upon a horizontally adjustable bearing bracket 66 carried by the vertical wall 34. The bearing bracket 66 and idler 65 are adjusted by means of an adjusting screw 67 carried by a fixed bracket 68 on the vertical wall 34, and the bearing bracket 66 is slotted as at 69 to allow this adjustment for properly tensioning the chain 64. This adjustment feature is substantially similar to the previously-described means 43–44, etc. for the conveyer belt rollers 39 and associated parts. The sprocket chain 64 also engages over a small idler sprocket 70 on the wall 34 and then around sprocket gear 71 keyed to the roller shaft 41 of conveyer 30.

A second sprocket chain 72 engages the sprocket gear 51, FIGURES 2 and 4, and extends transversely and horizontally toward the opposite end of the conveyer 30 and there engages around a sprocket gear 73 keyed to the shaft 40 of the other conveyer roller 39. A conventional chain tightener 74 on the conveyer structure wall 34 serves to resiliently tension the sprocket chain 72 and limit slack in the same at all times.

As should now be apparent, with the shaft turning continuously in the direction of the arrow, FIGURES 3 and 4, the clutch element 53 may be engaged with clutch head 52 of sprocket gear 51, and when this occurs, rotation is imparted to the sprocket gear 51 and the chain 72 moves in the direction of the arrow to drive the conveyor belt 37 in one direction, namely toward the right-hand side of the vehicle looking from the rear thereof toward its forward end or toward the top of FIGURE 2. When the clutch element 53 is thus engaged to drive the sprocket gear 51, sprocket gear 50 is idle and sprocket chain 64 is likewise idle. When the hand lever 61 is manipulated to shift clutch element 53 into driving engagement with clutch head 52 of sprocket gear 50, such sprocket gear is turned in the direction of the arrow, FIGURE 3, and the chain 64 is driven in the direction of the arrows for driving conveyor belt 37 in the opposite direction so as to discharge material from the opposite side of the machine or the left-hand side thereof looking forwardly in FIGURE 1. The necessary reversal of the direction of movement of the chain 64, FIGURE 3, is accomplished by having the chain 64 engage about the bottom of sprocket gear 50 as indicated in FIGURE 3. When the clutch element 53 is thus driving the chain 64 and associated elements, the chain 72 and associated elements is idle. When the clutch element 53 is engaging neither of the clutch heads 52 as depicted in FIGURE 2 no motion is imparted to the conveyor belt 37 while the shaft 46 continues to rotate.

As shown in FIGURE 2, a sprocket gear 75 is secured to shaft 46 rearwardly of sprocket gear 51, and the sprocket gear 75 is driven continuously by the shaft 46 and engages and drives a horizontal transverse sprocket chain 76, which chain also engages and drives continuously a relatively large sprocket gear 77, rigidly secured to a rotary shaft 78, journaled in bearings 79 and 80 on a pair of the cross beams 22. The shaft 78 extends horizontally and longitudinally of the vehicle beneath the floor or bed 23 thereof and is continuously driven whenever the shaft 46 is turning. A relatively large sprocket gear 81, a smaller diameter sprocket gear 82 and a still smaller sprocket gear 83 are rigidly secured to the shaft 78 in axially spaced relation to turn therewith. A fourth relatively small sprocket gear 84 is likewise rigidly secured to the shaft 78 to turn therewith near the rear bearing 80.

Sprocket chains 85, 86 and 87 engage the sprocket gears 81, 82 and 83 and are continuously driven thereby and extend horizontally and transversely toward one outer side of the vehicle, FIGURE 2. These chains are parallel, as shown, and at right angles to the shaft 78. At their outer sides, the endless chains 85, 86 and 87 engage respectively a relatively small sprocket gear 88, a somewhat larger sprocket gear 89, and a relatively small sprocket gear 90 of about the same diameter as the sprocket gear 88. These three sprocket gears 88, 89 and 90 are each provided upon one side thereof with an integral toothed clutch head 91 to turn therewith, and each sprocket gear 88, 89 and 90 is freely rotatably mounted upon an outer horizontal longitudinal shaft 92, journaled within and supported by suitable bearings 93 and 94 secured respectively to longitudinal beam 21 and the adjacent body upright 95. The sprocket gears 88, 89 and 90 may free wheel on the shaft 92 and are suitably held against axial movement thereon by the usual roll pins or the like.

With reference to FIGURES 2 and 7, a reversely moving sprocket chain 96 has its lower run 97, FIGURE 7, engaging over the sprocket gear 84 and extending downwardly and around an adjustable idler sprocket gear 98 and then upwardly and about a second idler sprocket gear 99 carried by the bearing structure 80. The endless sprocket chain 96 also engages a sprocket gear 100 of about the same diameter as the sprocket gear 90, freely rotatably mounted upon the shaft 92 and having an integral toothed clutch head 101 on one side thereof facing and spaced from the clutch head 91 of sprocket gear 90. The clutch heads 91 of gears 88 and 89 are also opposed and axially spaced as shown in FIGURE 2. The sprocket chain 96 is likewise continuously driven by the shaft 78 along with the other chains 85, 86 and 87 whenever the shaft 46 rotates, but the chain 96 moves in the opposite direction to the chains 85, 86 and 87 by virtue of the reverse gearing shown and described in connection with FIGURE 7. The sprocket gear 100 like the gears 88, 89 and 90 may free wheel upon the shaft 92 without turning this shaft.

Novel means shown in FIGURES 2, 6 and 9 and constituting an important feature of the invention is provided for selectively clutching or coupling any one of the sprocket gears 88, 89, 90 or 100 to the shaft 92 to turn this shaft in one direction at three different speeds or in the reverse direction at one speed. Such means comprises a pair of double toothed clutch elements 102 and 103 keyed to the shaft 92 to turn the same and axialy shiftable thereon. These clutch elements 102 and 103 are shifted in opposite axial directions by a pair of vertically swingable shifter levers 104 and 105 pivoted at 106 near and above their lower ends to brackets 107, rigidly secured to the adjacent longitudinal beam 21. The brackets 107 may be cross-braced at 108. The lower ends of levers 104 and 105 carry yokes 109 having swiveled engagement with the clutch elements 102 and 103 to shift the same axially when the levers are swung upon their pivots 106 for selectively engaging one clutch element 102 or 103 with one of the clutch heads 91 or 101. At their top ends, the levers 104 and 105 are pivotally secured respectively to horizontal longitudinal shifter links 110 and 111 having manual operating handles 112 and 113 at the forward ends thereof, readily accessible at one front corner of the vehicle body, FIGURE 1. The links 110 and 111 are slidably engaged through a rectangular slot 114 of a support bracket 115, suitably rigidly secured at 116 to the adjacent corner of the body 26. The links 110 and 111 are rectangular in cross section and each is provided in the outer side thereof with a vertical rectangular notch 117 and in the bottom thereof with three longitudinally spaced horizontal rectangular notches 118. The intermediate notches 118 are located adjacent the vertical notches 117 on each link, FIGURE 10. It will be noted that the width of the slot 114 in bracket 115 is equal to the total thickness of both links 110 and 111 less the depth of the vertical notch 117 in either link. This will allow link 110 or link 111 to be moved longitudinally in either direction only so long as the vertical notch 117 in one is engaged with the edge of slot 114 as shown in FIGURE 10. That is to say with regard to FIGURE 10, the shifter link 111 may be shifted longitudinally in either direction through the slot 114 to bring any of the three horizontal notches 118 into locking engagement with the slot while the other link 110 is held against movement longitudinally. Link 110 is rendered movable longitudinally when the notch 117 of link 111 is engaged with the slot 114.

The intermediate horizontal notches 118 of each link 110 and 111 correspond to the neutral position of the clutch element 102 and 103 operated by such link, while the other horizontal notches 118 of each link correspond to engaged positions of the clutch elements 102 and 103 with selected ones of the clutch head 91 and head 101 to impart varying speeds or reverse single speed operation to the shaft 92, as will be more completely described hereinafter. The vertical notches 117 adjacent the intermediate neutral position notches 118 assure that neither clutch element 102 or 103 can ever be improperly engaged with one of the sprocket gears on the shaft 92 while the other clutch element is already so engaged, and it is obviously essential that only one of the several sprocket gears 88, 89, 90 and 100 be engaged and driven at any one time for imparting a desired speed and direction of rotation to the shaft 92.

At its forward end, FIGURES 2 and 6, the shaft 92 carries a worm gear, not shown, within a gear box 119 continuously meshing with a relatively large worm wheel in the upper portion 120 of this gear box. The worm wheel is rigid with and drives a transverse horizontal apron shaft 121 spanning the vehicle transversely just rearwardly of the conveyor 30 and somewhat above the same, FIGURE 5. The shaft 121 is journaled for rotation within end and intermediate bearings 122, rigidly secured to longitudinal beams 21 and an intermediate beam 21′, FIGURE 2. The shaft 121 carries end and intermediate sprocket gears 123 rigid therewith, the two intermediate gears being omitted in FIGURE 2 for the sake of clarity. A transverse horizontal countershaft 124 is fixedly held at the rear end of the vehicle bed 23 within end and intermediate support bearings 125 and the shaft 124 does not rotate but is adjustable laterally toward and from the apron drive shaft 121 by screw-threaded adjusting means 126 on the support bearings 125, FIGURE 8. The shafts 121 and 124 are disposed at the same elevation slightly below the top face of the bed or floor 23.

Freely rotatably mounted on the shaft 124 are end and intermediate sprocket gears 127, held against axial movement by roll pins or the like and being aligned with the previously-described sprocket gears 123 of apron drive shaft 121. Longitudinally extending endless end and intermediate apron chains 128 engage the forward and rear sprocket gears 123 and 127 as shown and these apron chains are parallel and arranged at right angles to the conveyor 30 and move forwardly or rearwardly over the bed 23 in unison with three selectable forward speeds and one reverse speed due to the arrangement of the previously-described clutch elements 102 and 103 and associated controls. The apron chains 128 have their top runs sliding upon the vehicle bed 23 from the rear to the front ends thereof, while the bottom runs 129 of the apron chains extend and operate beneath the vehicle bed with suitable support or slack take-up means, not shown, if desired. The intermediate and end apron chains are interconnected at equidistantly spaced points by cross flights 130 which engage and propel forage or like produce longitudinally of the bed 23 toward the conveyor 30 or rearwardly, if preferred. The chains 128 are also equipped with projections 131 which also aid in moving the material within the vehicle body longitudinally over the bed 23. Thus, the chains 128 and flights 130 constitute an endless horizontal longitudinally movable conveyer or apron which may be selectively driven forwardly toward the conveyer 30 at three different speeds or reversely at one speed through the described operation of the clutch elements 102 and 103 and associated parts. When the clutch elements 102 and 103 are in neutral, FIGURE 6, the apron including the chains 128 is idle, and through the manual control handles 112 and 113, the apron may be controlled in any desired manner by the operator independently of the cross conveyer 30 which has it own control lever 61, as previously described. Both conveyer instrumentalities, however, derive their power from the one continuously rotating input shaft 46 as previously described.

A gear box 132 is rigidly mounted upon the front cross beam 32 at the center thereof, FIGURE 2, and this gear box contains meshing bevel gears 133, one of which is secured to and continuously driven by the input shaft 46 and the other of which is secured to a transverse horizontal rotary shaft 134 having an outboard bearing bracket 135 suitably rigidly secured to the adjacent longitudinal beam 21, FIGURE 5. Near its outer end, the continuously driven shaft 134 has a sprocket gear 136 freely rotatably mounted thereon, engaged by a vertically extending endless sprocket chain 137 having adjustable slack take-up means 138, and engaging a relatively large sprocket gear 139 keyed to a lower transverse horizontal beater shaft 140 which spans the interior of the vehicle body transversely between the side walls 27 thereof somewhat above the entrance flange 35 of the cross conveyer. The beater proper on the shaft 140 is conventional and is not shown in the drawings for the purpose of simplification. The opposite end of the lower beater shaft 140, FIGURE 6, carries a somewhat smaller sprocket gear 141 keyed thereto and engaging an upwardly extending endless sprocket chain 142 which operates outwardly of the adjacent vehicle body side wall 27 and close to the latter and between such side wall and the links 110 and 111, FIGURE 6. At its top, not shown, the chain 142 engages and drives another sprocket gear beneath a protective cover or housing 143, FIGURE 1, such other sprocket gear being secured to and driving an upper beater 144 of conventional construction, suitably journaled between and upon the side walls 27 above the lower beater of shaft 140. The two vertically spaced beaters are driven in unison to continuously agitate and break up the produce or forage which may tend to become caked, and the beaters tend also to regulate the passage of this material from the apron composed of chains 128 onto the transverse conveyer belt 127 beneath the lower beater. The upper beater 144 also prevents the material near the top of the box-like body 26 from sliding forwardly in great masses onto the belt 37 as would be undesirable. The two beaters when operating in unison tend to retard the forward movement of the material with the main apron and provide a regulated discharge from the lower portion of the mass of material onto the cross conveyer belt 37.

Clutch means are provided to render the beaters active or idle at the will of the operator and independently of the apron chains 128 and cross conveyer 30 while the input shaft 46 rotates continuously. Such means comprises a toothed clutch head 145 integral with the free wheeling sprocket gear 136, and a cooperating axially shiftable toothed clutch element 146 keyed to the shaft 134 to turn therewith. The clutch element 146 is shiftable into and out of coupling engagement with the clutch head 145 by a manual shifter lever 147 pivoted at 148 intermediate its ends to a lug 149 rigid with the bearing bracket 135. The lever 147 includes a yoke 150 swiveled to the clutch element 146 to shift the same axially upon swinging of the lever 147 upon its pivot. Thus the operator has a readily accessible separate control for the operation of the beater means as found desirable.

All exposed gearing may be covered and protected by suitable housing means, some of which is omitted in the drawings.

When the shaft 46 is in operation, the beater means, cross conveyer 30 and the apron chains 128 may all be driven in unison or selectively. The cross conveyer belt 37 may be driven selectively by manipulation of the clutch lever 61 in either direction to discharge material from the right or left hand side of the self-unloading vehicle. The main apron including chains 128 may be driven forwardly toward the cross conveyer 30 at one of any three speeds or rearwardly at one speed to discharge material from the rear of the self-unloading vehicle. This selective directional and variable speed movement of the main apron is afforded through the manipulation of the clutch elements 102 and 103 under control of the foolproof shifter links 110 and 111 having the neutral safety feature previously described.

When, for example, the handle 112 and link 110 are shifted to the right, FIGURE 6, the clutch element 102 will engage and be driven by the sprocket gear 88 and therefore drive the apron chains 128 at one forward speed as determined by the relative diameters of sprocket gears 81 and 88, FIGURE 2. If the handle 112 is pulled to the left, FIGURE 6, clutch element 102 engages and is driven by sprocket gear 89 to provide a second forward speed for the apron composed of chains 128, due to the gear reduction through sprocket gears 82 and 89. In like manner, if the handle 113 and link 111 are shifted to the right in FIGURE 6, clutch element 103 will engage and be driven by sprocket gear 90 and still another forward speed will be imparted to the main apron. If the handle 113 is shifted to the left in FIGURE 6, the double-ended clutch element 103 will engage and be driven by sprocket gear 100 for imparting to the apron chains 128 a reverse movement at a speed determined by the gearing 84–86–100. In all cases, the shaft 78 turns continuously as do the chains 85–86–87 and 96. The power to the apron chains 128 in all speeds and directions thereof is transmitted through the shaft 92 and gearing 119–120 to the front apron shaft 121 and from this shaft to the apron chains.

In connection with the cross conveyer 30, it is also contemplated within the scope of the invention to utilize endless chains and flights instead of the belt 37. In like manner, the main apron composed of chains 128 and flights 130 may be formed as a belt similar to the belt 37 only wider than the latter, if preferred.

It is to be understood that the form of the invention herewith shown and described is to be taken as a preferred example of the same and that various changes in the shape, size and arrangement of parts may be resorted to, without departing from the spirit of the invention or scope of the subjoined claims.

What is claimed is:

1. A self-unloading vehicle comprising a box-like body adapted to contain produce, an endless conveyer apron on said body and operating longitudinally thereof to convey the produce toward one end of the body, a cross conveyer on said body near one end thereof to receive the produce conveyed by said apron, a continuously driven rotary element on said body and transverse of said cross conveyer adapted for connection with power take-off means of a towing vehicle, separate endless loop gearing interconnecting said element and opposite ends of said cross conveyer and adapted to idle during rotation of the element, said separate endless loop gearing for opposite ends of said cross conveyor disposed in parallel planes spaced longitudinally of said rotary element, clutch means connected for rotation with and axially shiftable on said rotary element between said separate endless loop gearing to selectively couple said gearing to said element for driving the cross conveyer in either direction from opposite ends for discharging produce on either side of said vehicle, gearing connected with and driven by said element and drivingly engaging said apron and adapted to idle during rotation of said element, and separate clutch means to couple the second-named gearing to said element for driving the apron toward the cross conveyer.

2. In a self-unloading forage truck or the like, first and second conveyer means arranged and operating substantially at right angles to each other, rotary beater means on said truck above the conveyer means, a single continuously driven input shaft connected longitudinally of the truck and transverse of said first conveyor means adapted for connection with an external power source, first and second parallelly disposed endless loop gear trains connected for driving opposite ends of the first conveyer means including a pair of free wheeling gears longitudinally spaced on said input shaft having opposed clutch parts, a manually operable spaced clutch element between said clutch parts and shiftable transversely of the first conveyer selectively into engagement therewith and keyed to the input shaft, whereby the first and second gear trains one at a time may drive opposite ends of said first conveyor means to drive the first conveyor means in either direction, a third gear train for the second conveyer means connected with and driven continuously by said input shaft and having pairs of opposed free wheeling gears carrying the clutch parts, plural manually operable clutch elements between the last-named clutch parts and shiftable selectively into and out of engagement therewith for driving the second conveyer means toward the first conveyer means at varying speeds or away from the first conveyer means, a fourth gear train for said beater means connected with and continuously driven by said input shaft and including a free wheeling gear, and a separate manually operable clutch means selectively engageable with the last-named free wheeling gear so that the beater means may be rendered active or idle during operation of the first and second conveyer means.

3. A self-unloading forage truck or the like comprising a main endless apron conveyer extending longitudinally of the truck, a discharge conveyer extending transversely of the truck adjacent one end of the apron conveyer, end rolls for the discharge conveyer, a continuously driven rotary input shaft journaled upon the truck, sprocket gearing interconnecting the input shaft and said end rolls including reversing means for one of said end rolls, a manually operable clutch on said input shaft selectively engageable with portions of said sprocket gearing, whereby one end roll at a time may be powered from said input shaft to drive the discharge conveyer toward the selected side of said truck, shafts journaled upon said truck and carrying said main apron conveyer, right angle gearing connected with one of said shafts and driving it, additional sprocket gearing interconnecting said input shaft and right angle gearing and including speed change gearing and reverse gearing for said apron conveyer, and plural selectively operable manual clutch means for said last-named sprocket gearing enabling parts thereof to be selectively operated for driving the apron conveyer toward the discharge conveyer at multiple speeds and in a reverse direction relative to the discharge conveyer at a single speed.

4. A self-unloading vehicle comprising a wheeled box-like vehicle body having a bed, an endless main conveyer apron extending longitudinally of the bed and having an upper run extending close to the top of the bed and a lower run extending beneath the bed, a transverse endless discharge conveyer adjacent one end of said apron to receive material conveyed by the latter in one direction and adapted to discharge such material from either side of said vehicle, a continuously turning longitudinal power input shaft on said vehicle adapted to be driven from the power take-off means of a towing farm tractor, sprocket chain gearing drivingly connected with said discharge conveyer to operate the same in opposite directions and including a pair of spaced sprocket gears on said input shaft adapted to idle thereon while the input shaft is turning and having spaced opposed clutch heads, a clutch element keyed to the input shaft to turn therewith and shiftable axially thereon into coupling engagement selectively with said clutch heads to drive either of the latter, manually operable lever means connected with said clutch element to shift the same, a longitudinal countershaft spaced from said input shaft and parallel thereto, driving connecting means between the input and countershafts to turn the latter continuously, varying diameter sprocket gears on the countershaft to turn therewith, an apron drive shaft spaced from the countershaft and parallel thereto, coacting varying diameter sprocket gears on the apron drive shaft having free wheeling engagement thereon and forming with the countershaft sprocket gears multiple forward differential speed drives for said apron and a single speed reverse drive therefor, sprocket chains engaging and interconnecting the sprocket gears of the countershaft and apron drive shaft, clutch heads on opposed faces of the apron drive shaft sprocket gears and arranged in spaced opposed pairs, clutch elements keyed to the apron drive shaft and axially shiftable thereon for selective coupling engagement with the clutch heads so that any one of the latter may impart rotation to the apron drive shaft, separate manually operable shifter means for each clutch element rendering it independent of the other clutch element in operation, and gearing interconnecting the apron drive shaft and said apron to transmit power to the latter from said drive shaft.

5. The invention as defined by claim 4, and lock-out means for each shifter means to render one such means inoperable when the other is operable and vice-versa.

6. The invention as defined by claim 5, and wherein said lock-out means includes a bracket having an opening and said shifter means comprises a pair of side-by-side shifter links having handles and provide in their outer sides with single locking notches engageable with the edges of said bracket opening, the combined thickness of said links being such relative to said opening that one of said notches must be engaged with an edge of said opening in order for the opening to accommodate both of said links, one of said links being shiftable within said opening longitudinally when said notch of the other link is engaged with said edge, said links each provided upon a side thereof at right angles to said notches with three longitudinally spaced additional locking notches selectively engageable with another edge of said opening so that each shifter link may selectively position one clutch element in a neutral position or in two coupled positions with a pair of said clutch heads.

7. The invention as defined by claim 6, and wherein said shifter links and said opening are rectangular in cross section and the intermediate one of said additional notches is the neutral notch for the clutch element actuated by each shifter link, the other two of said additional notches in one shifter link positioning one of said clutch elements for driving said apron at two different forward speeds, and the other two like notches of the other shifter link positioning the other clutch element for driving the apron at a third forward speed and in reverse at one speed.

8. The invention as defined by claim 4, and rotary beater means on said vehicle body above said apron and discharge conveyer, gearing connected with the beater means to operate the same, a shaft engaging said input shaft and continuously driven thereby and also engaging said beater gearing with a part thereof idling on the last-named shaft, a clutch element carried by said idling part of the beater gearing, another clutch element on said last-named shaft and keyed thereto and shiftable axially thereon toward and from coupling engagement with the clutch element on said idling part, and manually operable means for said shiftable clutch element on said last-named shaft, whereby said beater means may be rendered active or inactive at the will of an operator.

9. A self-unloading vehicle comprising: a wheeled body having a bed, a discharge conveyer extending transversely of the bed adjacent one end thereof, rotary end shafts for opposite ends of the discharge conveyer, a continuously driven rotary input shaft longitudinally journaled upon the body and connected transverse of said discharge conveyor, separate sprocket gearing including endless loop gearing extending parallel with said discharge conveyor interconnecting the input shaft and said rotary end shafts at opposite ends of the conveyer, reversing means for the sprocket and endless loop gearing of one of said rotary end shafts, said separate sprocket gearing and endless loop gearing for opposite ends of conveyor being spaced relative to each other longitudinally of the body, a manually operable clutch axially shiftable on said input shaft between said separate sprocket gearing and endless loop gearing and selectively engageable with portions of said separate sprocket gearing, whereby one rotary end shaft at a time may be powered from said input shaft to drive the discharge conveyer from a selected end toward the corresponding side of the wheeled body.

References Cited by the Examiner
UNITED STATES PATENTS

| | | | |
|---|---|---|---|
| 1,276,903 | 8/18 | Green | 198—110 X |
| 1,927,461 | 9/33 | Lindgren | 198—110 |
| 1,945,532 | 2/34 | Lima | 214—83.36 |
| 2,017,156 | 10/35 | Mattler | 198—110 |
| 2,321,168 | 6/43 | Tognetti | 214—520 |
| 2,931,529 | 4/60 | Osterhaus | 214—519 |
| 3,084,821 | 4/63 | Knight | 214—519 |

HUGO O. SCHULZ, *Primary Examiner.*